UNITED STATES PATENT OFFICE.

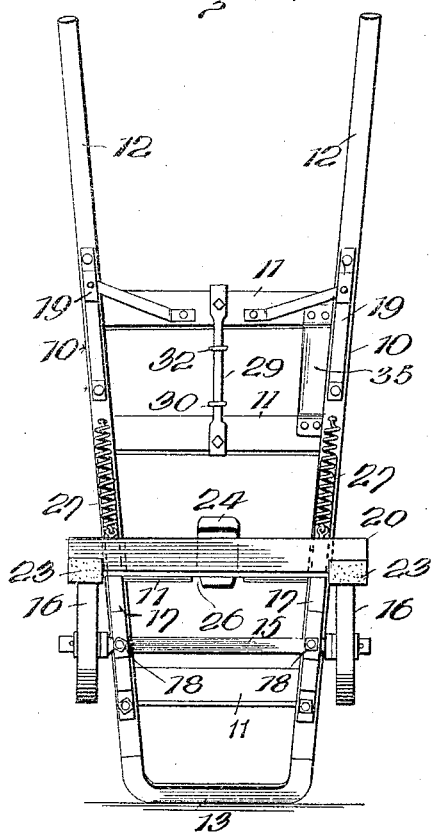
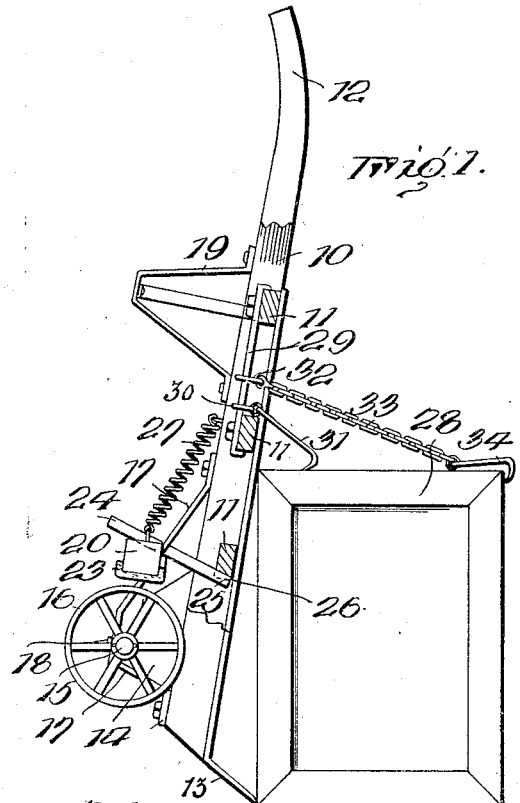
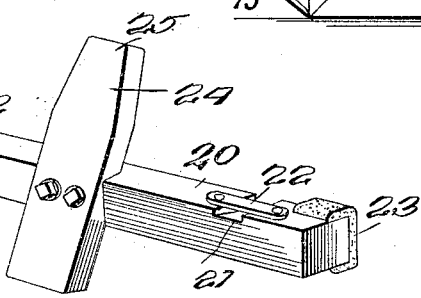

JOHN H. ALEXANDER, OF KANNAPOLIS, NORTH CAROLINA.

TRUCK-BRAKE.

1,200,792.  Specification of Letters Patent.  Patented Oct. 10, 1916.

Application filed January 26, 1916. Serial No. 74,412.

*To all whom it may concern:*

Be it known that I, JOHN H. ALEXANDER, a citizen of the United States, residing at Kannapolis, in the county of Cabarrus and State of North Carolina, have invented certain new and useful Improvements in Truck-Brakes, of which the following is a specification.

This invention relates to improvements in brake attachments for freight trucks, more particularly to devices of this character operated by hand and employed for moving freight in freight houses, warehouses, and for handling goods in stores and similar localities to aid the operator in loading heavy boxes, bales and other similar articles, and has for one of its objects to simplify and improve the construction and increase the efficiency and utility of devices of this character.

Another object of the invention is to provide a device of this character which may be attached without material structural change to trucks already manufactured.

Another object of the invention is to provide a device of this character including a brake mechanism and a package holding mechanism attached to the frame of the truck.

With these and other objects in view, the invention consists in certain novel features of construction as hereinafter shown and described and then specifically pointed out in the claims; and in the drawings illustrative of the preferred embodiment of the invention Figure 1 is a side elevation partly in section of a conventional truck with the improvement applied, the truck being in position to receive its load; Fig. 2 is a rear elevation of the improved device as shown in Fig. 1; Fig. 3 is an enlarged detached perspective view of the brake beam.

Corresponding and like parts are referred to in the following description and indicated in all the views of the drawings by the same reference characters.

Freight trucks as ordinarily constructed include side rails 10 and transverse connecting members 11, the latter spaced apart at suitable intervals. The side rails are extended at one end into handles 12 and provided at their other end with a nose or toe piece 13. Depending from the rail members at their forward ends are brackets, indicated as a whole at 14. The axle 15 is attached to the brackets 14 and carries the usual supporting wheels 16. Connected to each of the side members 10 forwardly and rearwardly of each bracket is a brace device 17 and each including a relatively long rearwardly directed portion inclined to the longitudinal axis of the side rails. The braces are coupled to the brackets by the same bolts 18 which connect the axles to the brackets. The side rail members are supported near the handle ends by leg members 19 of the usual construction.

The improved attachment comprises a brake beam 20 having transverse recesses 21 to slidably engage the rearwardly oblique portions of the braces 17 and held in position thereon by clips 22. The beam 20 is thus slidably engaged with the brace members, but is prevented from displacement relative thereto by the clips. Brake shoe devices 23 are connected to the beam 20 in position to engage the wheel 16 when the beam is actuated. The space between the rail members and the brace members with which the brake beam is slidably engaged, is sufficient to permit the beam to be actuated. Rigidly connected to the beam 20 is a foot lever 24, the upper end 25 of the foot lever being seated in a recess or socket indicated at 26, in one face of one of the transverse members 11. Springs 27 are connected at one end to the beam 20 and at the other end to the rail members 10 and operating to maintain the beam yieldably in its withdrawn position, or with the shoes 23 out of contact with the carrier wheels. By this simple arrangement it will be obvious that when the truck is disposed in the position shown in Fig. 1 with the nose or toe portion 13 beneath the article to be carried, indicated conventionally at 28, the operator by placing his foot upon the downwardly projecting portion of the lever 24 can apply the brake to the wheels and thus lock them in position and enable the article 28 to be tilted into position upon the truck without danger of moving the truck upon its wheels.

Connected to the underfaces of a contiguous pair of transverse members 11 is a rod 29, and slidably engaging the rod is a ring 30 to which a hooked rod 31 is swingingly coupled, the hook of the rod being designed to engage the article 28, as illustrated in Fig. 1, and thus couple the article to the truck so that when the latter is tilted over into horizontal position the article 28 will be carried with it. Another ring 32 is likewise slidably engaged with the rod 29, and provided with a chain 33 having a hooked terminal 34, to likewise engage the article 28, or a larger article when required. The rod 31 will be employed when smaller articles are to be transferred to the truck, while the chain 33 with its hook 34 will be employed when larger articles, such as bales or large boxes, are to be transferred to the truck. A receptacle 35 is supported beneath the truck frame in which the chain 33 and its hook 34 may be deposited when not in use.

The improved device is simple in construction, can be inexpensively manufactured and applied without material structural change to trucks of various sizes and to trucks employed for various purposes.

Having thus described the invention, what is claimed as new is:—

1. The combination with a truck frame, of an axle and bearing wheels, brace devices connected respectively to said axle and to said frame, a brake beam slidably engaging said brace devices and having shoes engaging said wheels, springs operating to yieldably hold said brake beam and its shoes out of engagement with said wheels, and means for moving said beam toward said wheels against the resistance of said springs.

2. The combination with a truck frame including side rails and a plurality of transverse members, of an axle and bearing wheels, brace devices connected respectively to said axle and to the side rails of said frame, a brake beam slidably engaging said brace devices and having shoes engaging said wheels, springs operating to yieldably hold said brake beam and its shoes out of engagement with said wheels, and a lever arm connected to said brake beam and bearing against one of said frame cross members and adapted to be actuated by the foot of the operator to move said beam toward said wheels against the resistance of said springs.

In testimony whereof I affix my signature.

JOHN H. ALEXANDER. [L. S.]

Copies of this patent may be obtained for five cents each, by addressing the "Commissioner of Patents, Washington, D. C."